(12) United States Patent
Sawatzki et al.

(10) Patent No.: US 10,858,044 B2
(45) Date of Patent: Dec. 8, 2020

(54) ELECTRIFIED VEHICLE AND DEFLECTOR ASSEMBLY FOR ELECTRIFIED VEHICLE

(71) Applicant: FORD GLOBAL TECHNOLOGIES, LLC, Dearborn, MI (US)

(72) Inventors: Marius Sawatzki, Pulheim (DE); Daniel Meckenstock, Wuppertal (DE); Michael Spurling, Romford (GB); Bradley Staines, Bishops Stortford (GB); Kriste Tomovski, Grosse Pointe Shores, MI (US); Mansoor Malik, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 16/219,310

(22) Filed: Dec. 13, 2018

(65) Prior Publication Data
US 2019/0210652 A1 Jul. 11, 2019

(30) Foreign Application Priority Data

Jan. 11, 2018 (DE) .......................... 10 2018 200 354

(51) Int. Cl.
| | | |
|---|---|---|
| *B62D 21/15* | (2006.01) | |
| *B60K 6/405* | (2007.10) | |
| *B60T 7/06* | (2006.01) | |
| *B62D 25/08* | (2006.01) | |

(52) U.S. Cl.
CPC ............ *B62D 21/152* (2013.01); *B60K 6/405* (2013.01); *B60T 7/065* (2013.01); *B62D 25/082* (2013.01)

(58) Field of Classification Search
CPC .... B62D 21/152; B62D 25/082; B60K 6/405; B60T 7/065; B60R 21/09
See application file for complete search history.

(56) References Cited

U.S. PATENT DOCUMENTS

| | | | | |
|---|---|---|---|---|
| 5,848,662 | A * | 12/1998 | Sakaue .................. | B60K 26/02 180/274 |
| 6,116,364 | A * | 9/2000 | Taguchi ................. | B60K 6/405 180/65.26 |
| 6,520,565 | B1 * | 2/2003 | Kjellberg ............. | B62D 21/152 296/187.09 |
| 7,624,835 | B2 | 12/2009 | Bowers | |

(Continued)

FOREIGN PATENT DOCUMENTS

| | | | |
|---|---|---|---|
| DE | 202017104333 U1 | 8/2017 | |
| EP | 2 439 111 | * 4/2012 | ............... G05G 1/32 |
| GB | 2230493 A | 10/1990 | |

OTHER PUBLICATIONS

Eastern Surplus & Equipment Co. "M35-415 | M35A2 and M35A3 Brake Booster Skid Plate". https://www.easternsurplus.net/PartDetails/2763/M35A2-and-M35A3-Brake-Booster-Skid-Plate.

*Primary Examiner* — Frank B Vanaman
(74) *Attorney, Agent, or Firm* — Vincent Mastrogiacomo; Brooks Kushman PC

(57) ABSTRACT

An assembly for an electrified vehicle having a housing containing a transmission, and a vehicle component positioned in a longitudinal direction between the housing and a passenger compartment, includes a deflector configured for mounting to the housing and having a deflection face configured to deflect the vehicle component and/or the housing away from the passenger compartment during a frontal collision.

17 Claims, 6 Drawing Sheets

(56) References Cited

U.S. PATENT DOCUMENTS

| | | | |
|---|---|---|---|
| 7,883,099 B2 | 2/2011 | Byers et al. | |
| 8,427,814 B1 | 4/2013 | Gonce | |
| 8,505,950 B2 | 8/2013 | Kolda et al. | |
| 9,387,756 B1 | 7/2016 | Whiting et al. | |
| 9,623,912 B2 | 4/2017 | Schlangen | |
| 2003/0066694 A1* | 4/2003 | Mita | B60K 17/04 |
| | | | 180/65.1 |
| 2003/0221511 A1* | 12/2003 | Misonou | B60T 7/065 |
| | | | 74/560 |
| 2004/0090085 A1* | 5/2004 | Kawasaki | B60L 3/0007 |
| | | | 296/187.09 |
| 2013/0154308 A1* | 6/2013 | Sotoyama | B62D 25/14 |
| | | | 296/187.08 |
| 2017/0144637 A1* | 5/2017 | Mashiki | G05G 1/327 |

* cited by examiner

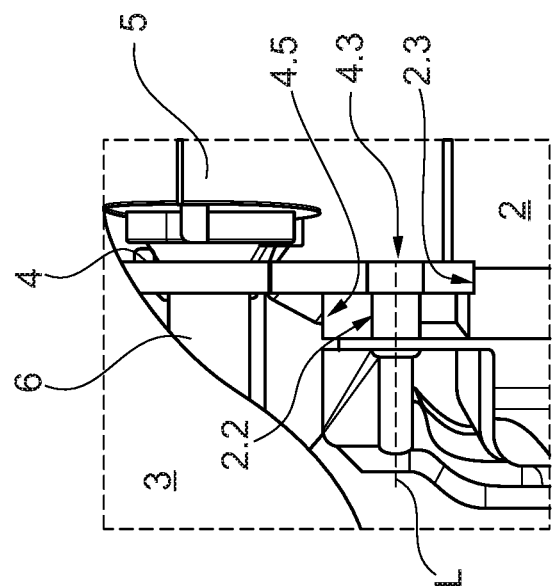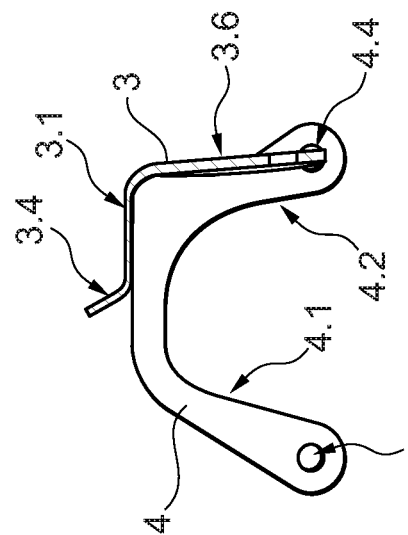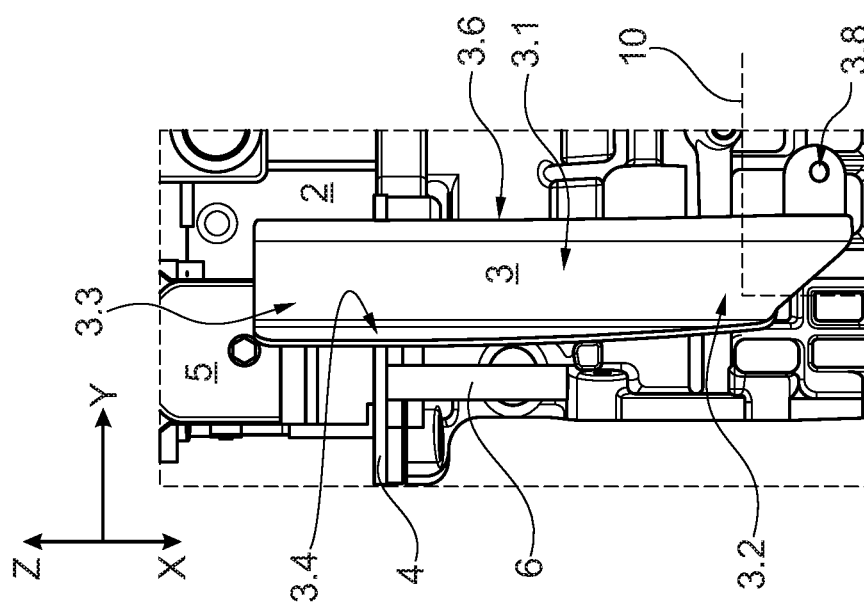
Fig. 5
Fig. 6
Fig. 4

ELECTRIFIED VEHICLE AND DEFLECTOR ASSEMBLY FOR ELECTRIFIED VEHICLE

CROSS-REFERENCE TO RELATED APPLICATIONS

This application claims foreign priority benefits under 35 U.S.C. § 119(a)-(d) to DE Application 10 2018 200 354.8 filed Jan. 11, 2018, which is hereby incorporated by reference in its entirety.

TECHNICAL FIELD

The disclosure relates to an electrified vehicle and a deflector assembly for an electrified vehicle that deflects a vehicle component away from a passenger compartment during a frontal collision.

BACKGROUND

A frequent type of accidents with motor vehicles is the head-on collision with another vehicle or a stationary obstacle. In this case, the occupants on the front seats, i.e. driver and front passenger, are particularly at risk. This applies in particular to the possibility of vehicle components entering the passenger cell. This problem exists in a particular form in modern hybrid vehicles. In said hybrid vehicles, a hybrid transmission is often arranged in the front region of the vehicle, i.e. in front of the passenger cell, which hybrid transmission is designed for high performances and also takes up much installation space for this reason. Above all, this relates to large dimensions along the Y-axis (transverse axis) and the Z-axis (vertical axis) of the vehicle. During a head-on collision, the transmission is predominantly displaced along the X-axis (longitudinal axis) and, because of its large expanse mentioned above, can collide with and push different vehicle components located behind in the direction of the passenger cell. The transmission is very compact and is normally hardly compressed during the accident.

In particular, the transmission can collide with components of a brake booster during a head-on collision. This leads to these components being pushed rearward, and with them the brake pedal, which is normally connected to the brake booster in a fixed manner. Depending on the engine compartment architecture, similar problems can also arise with other components, such as for example voltage transformers, chargers, ESPs, heater units etc. which can interact with motor components or establish a load path. A component pushed into the firewall can—depending on the installation position of the respective component—also constitute a hazard for the front passenger. When the firewall is pushed into the passenger cell, the instrument panel can be displaced and/or deformed. Beyond this, sharp plastic fracture edges towards the occupants can occur and/or the front passenger airbag can be displaced and thus fail to optimally protect the head of the front passenger. A further problem is that in the case of a hybrid transmission, electrical components, which carry substantial voltage, are often routed on its outside and can be damaged during a collision with the brake booster, which can result in short circuits or parts of the vehicle being exposed to electric voltage in an uncontrolled manner.

U.S. Pat. No. 9,387,756 B1 discloses a hybrid driving device with a primary driving source, which via a driveshaft is coupled to a differential, which drives two output shafts. An articulated axle shaft for a vehicle wheel is coupled to each of the output shafts via a secondary driving source in each case. The driving device can in particular be retrofitted to a vehicle. According to an exemplary embodiment, an underride protection is provided underneath a rear axle transmission, which on the one hand serves for the structural reinforcement and on the other hand for the protection of electric motors serving as secondary driving sources.

U.S. Pat. No. 8,505,950 B2 shows a system of a truck-tractor and a semitrailer, in the case of which the semitrailer is connected to the truck-tractor by way of an electrical line or a coolant line. The relevant line in this case is routed flexibly and is supported on a sliding plate, which is mounted on a top side of the truck-tractor.

From U.S. Pat. No. 9,623,912 B2 a utility vehicle is known, which comprises a frame assembly and a roll cage, which surrounds a sitting region. According to an embodiment, the frame assembly comprises a detachable front part, which in turn comprises a plate serving as underride protection. This can consist of reinforced materials.

U.S. Pat. No. 8,427,814 B1 discloses a mobile energy distribution system with connections for a first and a second energy source, a transformer as well as a plurality of electrical connections for consumers. The distribution system is arranged on a platform which in turn can be mounted either on wheels or on skids.

U.S. Pat. No. 7,883,099 B2 shows a toy car, which is driven by an internal combustion engine. In a front region, a bumper is followed by a plate serving as underride protection, which is slopingly inclined, in order to deflect the car upwards over the obstacle in the case of contact with ground obstacles. Here, the plate can consist of elastic plastic and absorb shocks in the manner of a leaf spring.

From U.S. Pat. No. 7,624,835 B2 a protective covering for an underside of a vehicle is known, which is formed of plastic, in order to react flexibly during a collision with an obstacle. The protective covering comprises through-bores for screws for connection to the vehicle body, and various stiffening ribs. According to a shown embodiment, the protective covering serves for protecting a rear axle transmission of an off-road vehicle.

In view of the shown prior art, the improvement of the safety during front-end collisions, in particular in the case of motor vehicles with hybrid drive, still has scope for improvements.

SUMMARY

Various embodiments of the disclosure operate to mitigate passenger cell intrusion in the event of a front-end collision.

It must be pointed out that the features and measures which are individually mentioned in the following description can be combined with one another in any technically practical manner and show further configurations that are not specifically described or illustrated. The description additionally characterizes and specifies the representative embodiments in particular in connection with the figures.

In one or more embodiments, the vehicle can be in particular a car or utility vehicle. It can be a motor vehicle having an internal combustion engine or an electric motor, it can, in particular, be a vehicle with hybrid drive.

In one embodiment, an assembly comprises a transmission unit and a vehicle component arranged in the X-direction or longitudinal direction behind the former. Here, the transmission unit comprises at least parts of a transmission, by way of which a driving force of at least one motor is transmitted to at least one, normally 2 or 4 driven wheels of the motor vehicle. The intended installation position of the transmission unit in this case is usually in the front part of the vehicle, in front of the passenger cell. In addition to the parts which actually serve for the force transfer and/or transmission, such a transmission unit usually comprises a transmission housing, in which the moveable parts are arranged. In the X-direction (i.e. in the longitudinal direction of the vehicle), the vehicle component is arranged behind the transmission unit, i.e. nearer the rear of the vehicle. In the case of a front-end collision, during which the transmission unit can be pushed to the back in the X-direction, there is thus the risk that it collides with the vehicle component and in turn pushes the same towards the back. Because of this, it can happen that the vehicle component or a further component connected with the same enters the passenger cell. For example, the vehicle component could be a brake booster in particular an electric or electromechanical brake booster, which is connected to a brake pedal. In the case of an accident, there would thus exist the risk that the brake pedal is pushed into the foot well of the passenger cell by the brake booster.

According to an embodiment, a deflection element is therefore connected to the transmission unit, which in the X-direction is arranged between the transmission unit and the vehicle component and which comprises a deflection face for deflecting the vehicle component, wherein the deflection face has a primary inclination relative to the X-axis. By arranging the deflection element in the X-direction between the transmission unit and the vehicle component, impacting of the deflection element and of the vehicle component primarily occurs during a front-end collision, during which the transmission unit is pushed towards the back in the X-direction. Here it is provided that the vehicle component at least partly impacts the deflection face, which as described, has a primary inclination relative to the X-axis towards the same. Preferably, the primary inclination is a height inclination relative to the X-axis towards the Z-axis. The height inclination could also be referred to as (height) inclination angle relative to the X-axis within the X-Z plane. One could also say that the deflection face extends obliquely within the X-Z plane. Impacting of the vehicle components results in a deflection of the same transversely to the X-axis, in the case of a height inclination thus in the vertical direction (Z-direction), as a result of which it can quasi evade the transmission unit. Here it is possible that at the same time a (normally minor) deflection of the transmission unit in the opposite direction occurs. The deflection of the vehicle component usually occurs towards the top, i.e. in the positive Z-direction, wherein the deflection face faces obliquely towards the top. However, depending on the relevant installation position of the transmission unit and of the vehicle component it would also be possible as an alternative for the deflection of the vehicle component to occur downwards, wherein the deflection face faces obliquely towards the bottom. As will still be explained later on, the height inclination need not be constant on the entire deflection face. Within itself, the deflection face is normally smooth in order to facilitate sliding of the vehicle component. With respect to the orientation of the deflection face relative to the X-Y plane, different possibilities are available. Normally, the deflection face extends parallel to the Y-axis. In this case, no deflection of the vehicle component in the Y-direction occurs through the contact with the deflection face. However it is also conceivable in principle that the deflection face is inclined relative to the Y-axis, as a result of which a lateral force on the vehicle component can be generated, provided this is advantageous for the deflection of the same. Under certain conditions, the deflection face can also extend parallel to the Z-axis, wherein the primary inclination is towards the Y-axis and can thus be referred to as lateral inclination.

The deflection element can have different forms and be formed of different materials. Because of the substantial forces that are active during an accident, a high stability of the deflection element is generally required which is why it can be typically formed of metal, for example steel or a light metal such as aluminum. Under certain conditions, composite materials could also be employed however. Altogether, the deflection element can be formed of a flat material, for example a plate or a metal sheet. In particular, it can be a sheet metal part.

In particular, the transmission unit can be assigned to a hybrid transmission, wherein at least one electric element in the region of the deflection element is connected to the transmission unit. In this case, the transmission unit is designed as a hybrid transmission or is part of a hybrid transmission. The electric element is a component which in the operating state carries electric voltage, for example a cable, a connector or the like. Thus, the electric element could also be referred to as voltage-carrying element. Normally it serves for connecting an electric motor integrated in the hybrid transmission to a battery of the motor vehicle. It is particularly advantageous when the deflection element is connected to the transmission unit in the region of the electric element since in the event of the vehicle component impacting the electric element damage to the latter would have to be expected, which in turn could result in that a short circuit occurs or parts of the motor vehicle are exposed to electric voltage in a manner that is not foreseeable. In this embodiment, the deflection element serves in particular to keep away and deflect the vehicle component from the electric element. In particular, the electric element can be arranged in the X-direction between the transmission unit and the vehicle component, by way of which the vehicle component without the existence of the deflection element could directly impact the electric element.

According to a preferred configuration, the primary inclination along the X-axis increases from the back to the front. This means that in a rear region, which faces the vehicle component, a lower primary inclination (e.g. height inclination) is formed than in a front region, which faces away from the vehicle component. The deflecting force component transversely to the X-axis is obviously the greater, the greater the primary inclination is. Thus when it is provided that the vehicle component initially impacts the rear region, it is primarily subjected to a lower force component transversely to the X-axis, which is amplified during the further course of the movement, when the vehicle component comes into contact with the front region. Under certain conditions, the rear region can be referred to as an interception section which quasi intercepts and initiates the deflection of the vehicle component. The front region can be referred to as a main deflection section (or, in the case of a height inclination, as a height deflection section), which determines the deflection during the further course. The transition between the interception section and the height deflection section can take place discontinuously, with one inner edge, or continuously, i.e. with a curvature.

According to one configuration, the deflection element, transversely to the X-axis laterally of the deflection face, comprises a boundary face that is angled relative to the same and extends away from the transmission unit. In the case of a height inclination of the deflection face, the boundary face is arranged in the Y-direction laterally of the deflection face. Here, the boundary face quasi forms a boundary of the deflection face transversely to the X-axis (in the Y-direction and/or in the Z-direction). Provided that the deflection element transversely to the X-axis is arranged asymmetrically regarding the electric element, the boundary face is arranged on that side of the deflection face which faces the electric element. In particular, the boundary face can be arranged transversely to the X-axis between the deflection face and the electric element. During a sliding-along of the vehicle component on the deflection face, the function of the boundary face consists in preventing that the vehicle component on the sides of the boundary face is laterally diverted off the deflection face and collides with the transmission unit or in particular with the electric element. Here, the deflection face can be formed by a first flange which extends (transversely to the X-axis, i.e. for example with respect to the Y-direction) laterally of the deflection face. The boundary face extends away from the transmission unit, i.e. in the case of a height inclination of the deflection face normally upwards. Here it can include in particular an angle between 30 and 90° with the deflection face. The transition from the deflection face to the boundary face can be formed discontinuously or continuously. Under certain conditions, the boundary face can comprise interruptions or multiple boundary faces following one another can be provided. However, normally this is a single, continuous boundary face. Like the deflection face, the boundary face is normally designed smooth.

Insofar as the boundary face is formed by a first flange, a second flange can be formed on a side located opposite the boundary face, but which however extends towards the transmission unit. Here, this second flange primarily has the function of structurally stabilizing the deflection element but it can also serve for attaching the deflection element to the transmission unit.

The boundary face as described generally serves for preventing the vehicle component from sliding off the deflection face. Complementarily, however, it can also serve for laterally deflecting the vehicle component (i.e. transversely to the X-axis, in particular in the direction of the Y-axis). According to an embodiment, the boundary face accordingly has a secondary inclination relative to the X-axis at least in sections, so that it extends from the back to the front towards a side which is located opposite. If the boundary face is arranged in the Y-direction to the side of the deflection face, said boundary face extends at least in sections from the back to the front towards the side which is located opposite in the Y-direction, in which case the secondary inclination is a lateral inclination. The relevant lateral inclination, which can also be referred to as (lateral) inclination angle relative to the X-axis, ensures that the vehicle component on impacting with the boundary face is subjected to a force component in the Y-direction, which results in a lateral deflection. Because of this, in turn, an impacting on an electric element for example can be securely prevented. The boundary face may be inclined away from the electric element, so that when the same is thus located for example left of the deflection element, the boundary face is inclined towards the right. In particular, the secondary inclination (lateral inclination) can increase along the X-axis from the back towards the front, which includes the possibility that the relevant secondary inclination in a rear region is zero, i.e. that the boundary face there extends for example within the X-Z plane or the X-Y plane. The secondary inclination can continuously or discontinuously increase in size from the back to the front. It can be, in particular, that a rear section of the boundary face further back comprises a boundary section, where it extends within the X-Z plane and further forward, a lateral deflection section, where it is inclined towards the Y-axis.

According to an embodiment, the electric element is at least partly arranged in the X-direction between the deflection element and the transmission unit. One could say that the deflection element, from the view of the vehicle component, shields or covers the electric element at least partly. In the case of a height inclination of the deflection face it can be provided in particular here that the deflection element with its front end extends in the Z-direction at least so far as the electric element, so that the vehicle component is quasi guided away over the electric element (or below the same) in the case that the deflection face is directed downwards. In the case of a lateral inclination of the deflection face, the deflection element with its front end can extend in the Y-direction at least as far as the electric element.

Regarding the connection of the deflection element with the transmission unit there are various possibilities. The connection can be at least partly provided by a second flange as described above, which is screwed for example to the transmission unit. Preferably, the deflection element is connected to the transmission unit via at least one bracket extending at an angle to the deflection face. This bracket can be produced separately from the deflection element and be formed for example also as a sheet metal part. It extends at an angle to the deflection face, for example at a right angle or at an angle between 60 and 90°, as a result of which an optimal absorption of forces acting perpendicularly to the deflection face can be achieved. Here, the bracket can be connected to the deflection element in a firmly bonded manner, for example by welding, complementarily or alternatively however a form-fit and/or force-fit connection is/are also possible. The bracket can be connected to the transmission unit for example in a force-fit and/or form-fit manner, for example by screwing. Besides the connection to the transmission unit, the bracket can also serve for structurally stiffening the deflection element.

The bracket may comprise two leg sections which are arranged transversely to the X-axis on both sides of the electric element. In the case of a height inclination of the deflection face, the two sections are arranged in the Y-direction on both sides of the electric element, in the case of a lateral inclination of the deflection face in the Z-direction, on both sides of the electric element. Between these two sections, of which each is connected to the transmission unit, an intermediate space is provided in which at least one part of the electric element is arranged. Provided that the electric element is a cable, it can be passed through for example between the two sections. By way of the two leg sections, an optimal support of the bracket on both sides of the electric element is provided, which can be advantageous in particular with an asymmetrical arrangement as described above. Provided that the deflection element is arranged for example offset to the right, one of the two leg sections can be arranged to the left of the electric element, as a result of which forces acting on the boundary face for example can be better absorbed.

According to a configuration, the bracket is connected to the transmission unit by at least one connecting pin, wherein the bracket and/or the transmission unit have a step section projecting in the direction of a longitudinal axis of the connecting pin, which establishes a form-fit connection transversely to the longitudinal axis. The connecting pin can for example be a threaded pin or a screw, by way of which a screw connection is established. When during an accident forces act on the deflection face, the same are also transmitted to the bracket and, depending on the orientation of the connecting pin, can result in shearing forces (transversely to the longitudinal axis of the same). Such shearing forces can load the connecting pin or even result in it breaking off, which would negatively affect the proper functioning of the deflection element. In the described embodiment, the shearing forces can be absorbed by a form-fit connection between the transmission unit and the bracket, as a result of which load is taken off the connecting pin. The term "step section" should not be interpreted as being restrictive here and it can be any type of section which, relative to the adjoining regions of the transmission unit or of the bracket, projects in the direction of the longitudinal axis of the connecting pin.

In some embodiments, it can be provided that the deflection element, regarding the transmission unit, behaves in a largely stiff manner and remains fixed in position. Under certain conditions however a certain displacement and/or deformation of the deflection element can also be provided. According to such an embodiment, the deflection element on exceeding a threshold force acting on the deflection face is at least partly displaceable towards the transmission unit, wherein at least one supporting section of the deflection element is designed in order to limit the displacement by support on the transmission unit. Here, the threshold force constitutes an intended force of certain magnitude which during the normal operation of the vehicle and under circumstances with less serious accidents is not exceeded. Thus, when a force acting on the deflection face is smaller than the threshold force, the deflection element remains substantially fixed in position. When the threshold force is exceeded at least one part of the deflection element is however displaceable towards the transmission unit, which can be accompanied by an elastic and/or plastic deformation of the deflection element. While a part is displaced towards the transmission unit, another part can maintain its distance from the transmission unit. However, a displacement of the entire deflection element can also occur. Preferably, the deflection element in this case is displaceable relative to the transmission unit in a guided manner. Here it is provided, however, that the displacement is limited namely by a supporting section of the deflection element, which supports itself on the transmission unit. Here, the supporting section in the normal operating state is spaced apart from the transmission unit and comes into contact with the transmission unit only through the described displacement. The intended displacement in this case is provided by the initial distance of the supporting section from the transmission unit and can be relatively minor, for example between 1 mm and 5 mm. The at least one supporting section in this case can be formed for example by the abovementioned second flange or follow the same. A possibility of realizing the displacement above the threshold force consists in that the deflection element is connected to the transmission unit by a screw which is passed through an elongated hole of the deflection element. Here, a force-fit connection can be provided by the tightened screw head below the threshold force, which is cancelled out above the threshold force so that a displacement of the screw along the elongated hole occurs. Here, guiding of the deflection element is ensured by the form-fit connection between screw and elongated hole even during the displacement.

The described displaceability can be advantageous for different reasons. It can be necessary for example for tolerance and installation reasons that certain distances between the transmission unit and the deflection element have to be maintained. These distances enlarge the entire assembly which is generally disadvantageous. By a controlled compressing of the structure the size is reduced. In addition to this it can be difficult under certain conditions to favorably attach the deflection element to the transmission housing, i.e. the attachment, which determines the position of the deflection element during the normal operation of the vehicle, can be loaded only up to a certain threshold force if applicable. A displacement then takes place but which as described above is limited by the supporting on the transmission unit. By way of this, the functionality of the deflection element can be ensured even when the primary attachment only has a limited load capacity.

Further advantageous details and effects of the invention are described in more detail in the following by way of different embodiments shown in the figures.

BRIEF DESCRIPTION OF THE DRAWINGS

FIG. 4 shows a representation of the first embodiment of an assembly from a third viewpoint;

FIG. 5 shows a detail view of the assembly from FIGS. 2 to 4;

FIG. 6 shows a representation of a deflection element and of a bracket of the assembly from FIGS. 2 to 5;

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments.

In the various figures, the same parts are marked with the same reference numbers and therefore are generally described only once.

Figure 1:
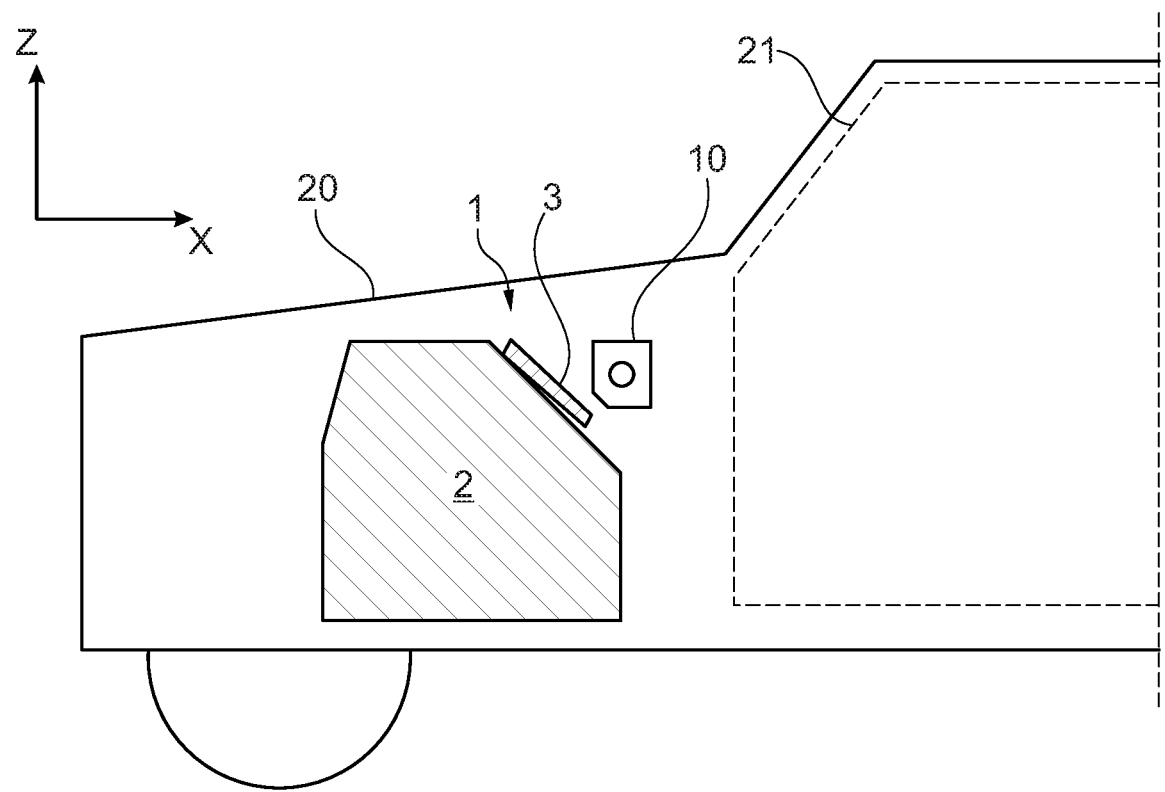
FIG. 1 shows a part of a motor vehicle with an assembly according to an embodiment.

FIG. 1 shows in a highly schematic manner a sectional representation of a part of a motor vehicle 20, to be more precise of a car, with an assembly 1 according to an embodiment. The assembly 1 comprises a hybrid transmission 2, which is located in a front part of the motor vehicle 20. Along the X-axis behind the hybrid transmission 2, an electric brake booster 10 is arranged, which is connected to a brake pedal which is not shown here. During a front-end collision with a stationary obstacle or another vehicle, the hybrid transmission 2 could be pushed to the back along the X-axis and thus impact the brake booster 10. Because of this, the brake pedal in turn could be pushed into a passenger cell 21.

A deflection element 3 is connected to the hybrid transmission 2. The deflection element 3 is arranged along the X-axis between the hybrid transmission 2 and the brake booster 10. By means of a deflection face 3.1, which has a primary inclination, more precisely a height inclination relative to the X-axis in the direction of the Z-axis, the brake booster 10 can be deflected towards the top, so that it can quasi evade the hybrid transmission 2.

Figure 3:
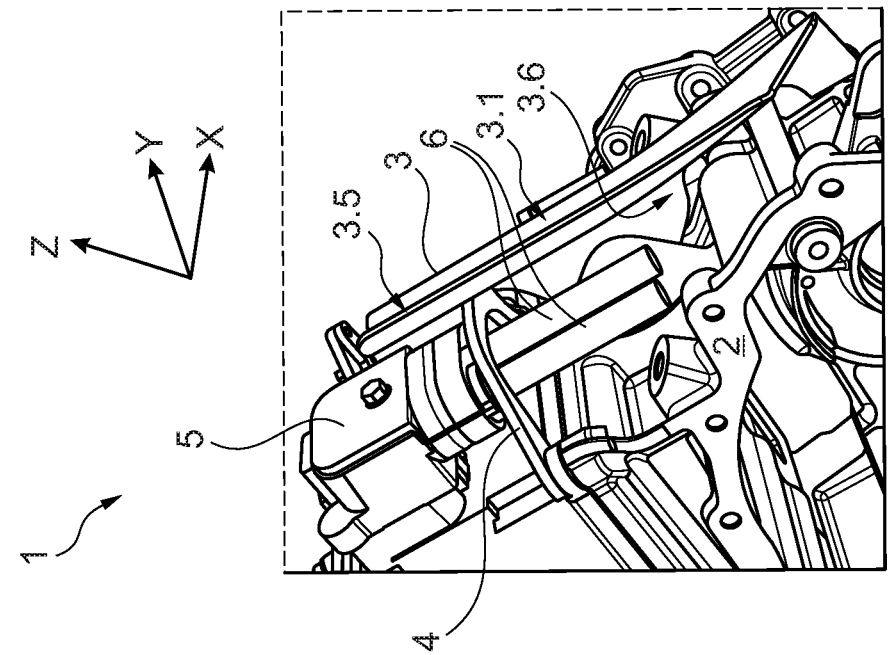
FIG. 3 shows a perspective representation of the first embodiment of an assembly from a second viewpoint.
Figure 2:
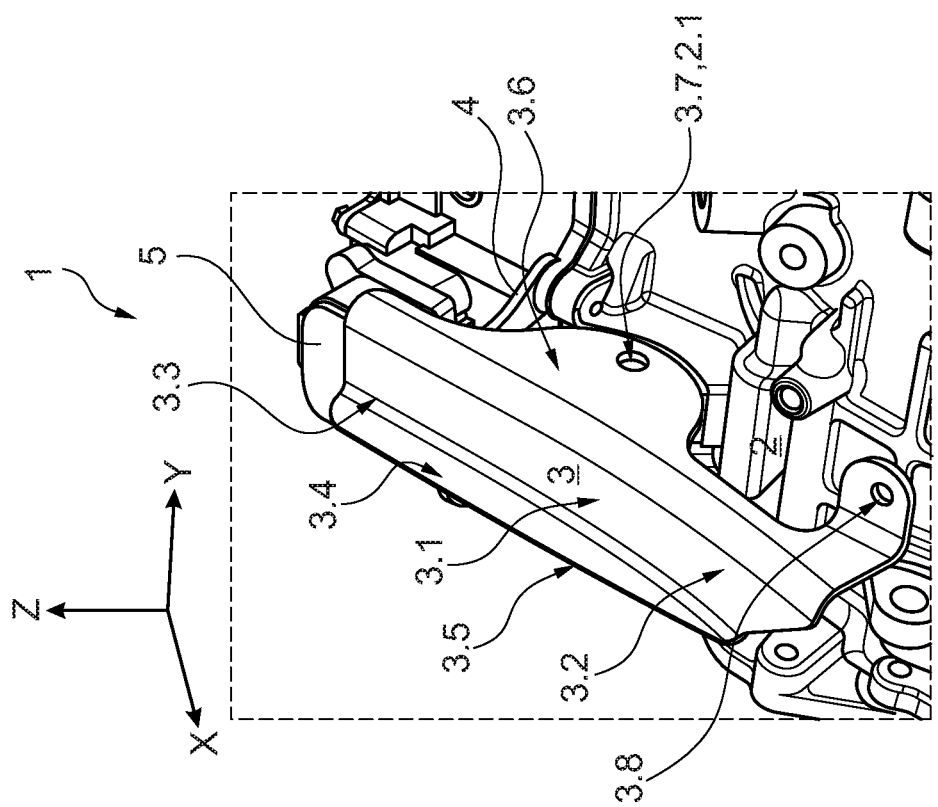
FIG. 2 shows a perspective representations of a first embodiment of an assembly from a first viewpoint.

FIGS. 2 to 7 show a first embodiment of the assembly 1. In particular, FIGS. 2 and 3 show perspective detail views of the hybrid transmission 2 with the deflection element 3. The latter, in the shown embodiment, is designed as a sheet metal part, for example.

The height inclination of the deflection face 3.1 is not constant, but is less in an interception section 3.2 arranged with respect to the X-axis further back than in a height deflection section 3.3 arranged further to the front. With respect to the Y-axis laterally of the deflection face 3.1, a boundary face 3.4 extending away from the hybrid transmission 2 follows, which in the shown example includes an angle of approximately 45° with the deflection face 3.1. However, smaller or larger angles, for example between 30 and 90°, are also possible as an alternative.

Here, the boundary face 3.4 is formed by a first flange 3.5 of the deflection element 3. On a side located opposite, a second flange 3.6 is formed which on the one hand serves for stabilizing the deflection element 3 and on the other hand for connecting the same to the hybrid transmission 2. For the latter purpose, bores 3.7, 3.8 are provided, through which screws which are not shown here are passed in order to establish a form-fit and force-fit connection with the hybrid transmission 2. A bore 3.7 is aligned with a corresponding threaded bore 2.1 of the hybrid transmission 2.

The deflecting of the brake booster 10 on the one hand serves for protecting the driver against the brake pedal entering the passenger cell 21. On the other hand, the intention is to prevent electric elements 5, 6, which are connected to the hybrid transmission 2 and are arranged on the surface of the same, from damage by the brake booster 10. In the shown example, two cables 6 are connected to the hybrid transmission 2 by a connector 5. These serve for supplying an electric motor integrated in the hybrid transmission 2 with power using an accumulator of the motor vehicle 20. Damage to the electric elements 5, 6 could result in short circuits or in that components of the motor vehicle 20 are exposed to electric voltage in an unforeseen manner.

As is noticeable in particular in FIG. 4, the deflection element 3 along the Y-axis is arranged asymmetrically regarding the electric elements 5, 6, however it partly covers these, so that the same along the X-axis are arranged between the hybrid transmission 2 and the deflection element 3. As is evident from the position of the brake booster 10 indicated by the dashed line in FIG. 4, the deflection element 3 is also arranged at least partly between the electric elements 5, 6 and the brake booster 10, thus quasi shields the electric elements 5, 6 relative to the same. Here it should be noted in particular that the boundary face 3.4 is arranged on a side of the deflection face 3.1 facing the electric elements 5, 6 and thus prevents or at least greatly impedes the brake booster 10 sliding-off on this side.

While the deflection element 3 as described is connected to the hybrid transmission 2 on the one hand via the second flange 3.6, the relevant connection is particularly improved by a bracket 4 that is likewise formed as a sheet metal part, which is noticeable in particular in FIGS. 5 and 6. On a side facing away from the deflection face 3.1, the bracket 4 is welded to the deflection element 3. The bracket 4 comprises two leg sections 4.1, 4.2, each of which on the end side have bores 4.3, 4.4, through which screws (not shown) for connecting to the hybrid transmission 2 are passed. In particular, the bracket 4 contributes to structurally stabilizing the deflection element 3 and improving the connection to the hybrid transmission 2 of the same in that forces which proportionally act along the Y-axis can be better absorbed. Accordingly, forces acting for example on the boundary face 3.4 can be favorably absorbed via a first leg section 4.1 which is shown in FIGS. 4 and 6 on the left.

FIG. 5 shows a sectional representation explaining the connection of the first leg section 4.1 to the hybrid transmission 2. Here, the bore 4.3 is in alignment with a threaded bore 2.2 of the hybrid transmission 2. A screw which is not shown is passed through these bores 2.2, 4.3, the longitudinal axis L of which is shown in FIG. 5. In order to avoid any shearing forces on the screw, the leg section 4.1 comprises a first step section 4.5 and the hybrid transmission 2 comprises a second step section 2.3. Here, each of the step sections 2.3, 4.5 project in the direction of the longitudinal axis L and thus form a form-fit connection transversely to the longitudinal axis L. It could be said that the leg section 4.1 and the hybrid transmission 2 support themselves on one another by means of these step sections 2.3, 4.5.

Figure 7:
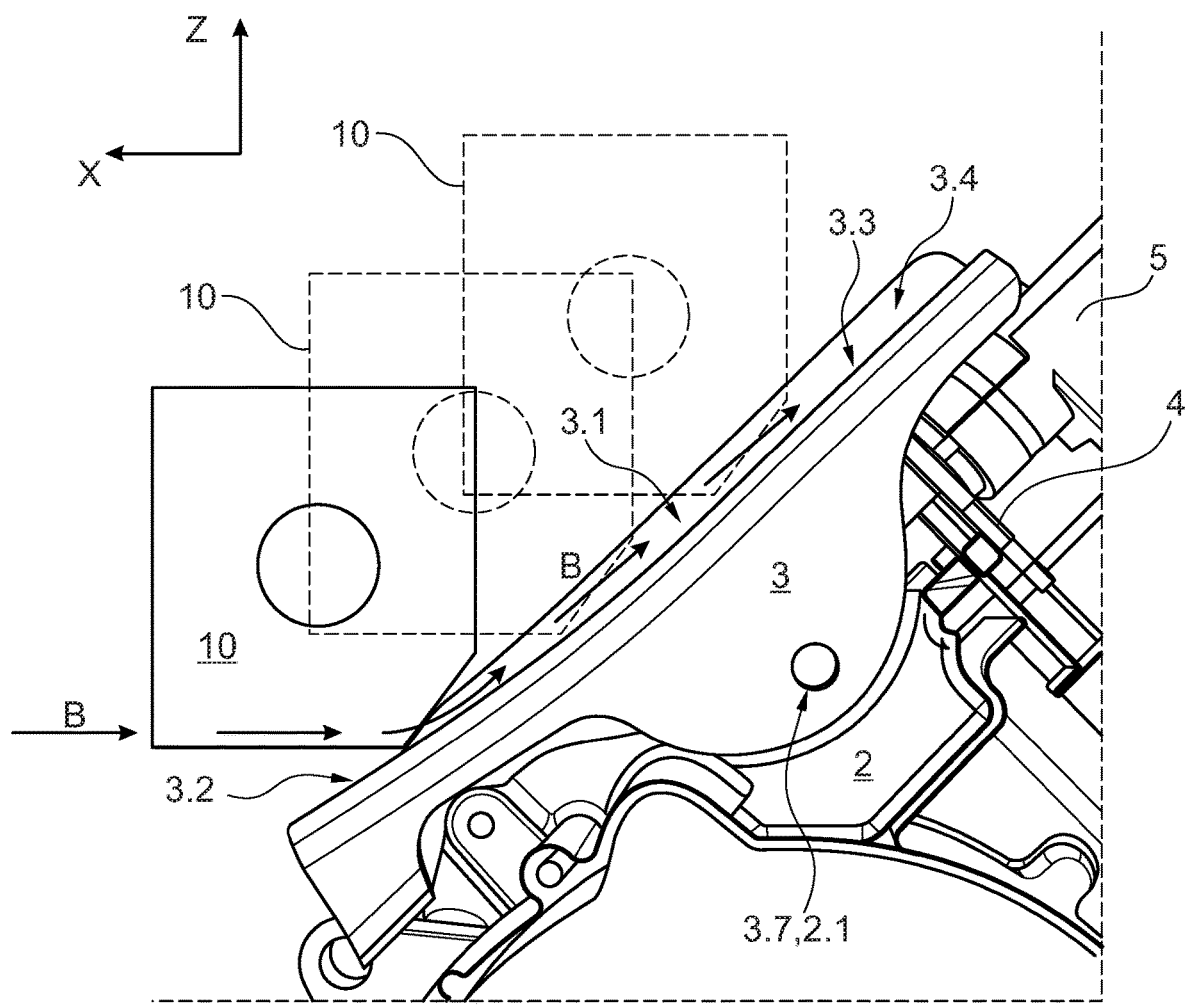
FIG. 7 shows a lateral view of a part of the assembly from FIGS. 2 to 6 during a front-end collision.

In a lateral view, FIG. 7 shows a possible movement sequence of the brake booster 10 along the deflection element 3. Here, the continuous line corresponds to a first phase of the deflection operation, the dashed line to a second phase of the deflection operation and the dash-dotted line to a third phase of the deflection operation. In addition to this, a relative movement B of the brake booster 10 is indicated by the thick arrows. As is evident, the initially purely horizontal relative movement B is proportionally deflected vertically upwards by the interception section 3.2, wherein this movement is initially determined by the lower height inclination of the interception section 3.2. During the further course, the brake booster 10 reaches the height deflection section 3.3, which has a greater height inclination, by way of which the vertical component of the relative movement B is also enlarged. Should the brake booster 10 along the Y-axis evade in the direction of the electric elements 5, 6, this evading is restricted or prevented by the presence of the boundary face 3.4.

Figure 8:
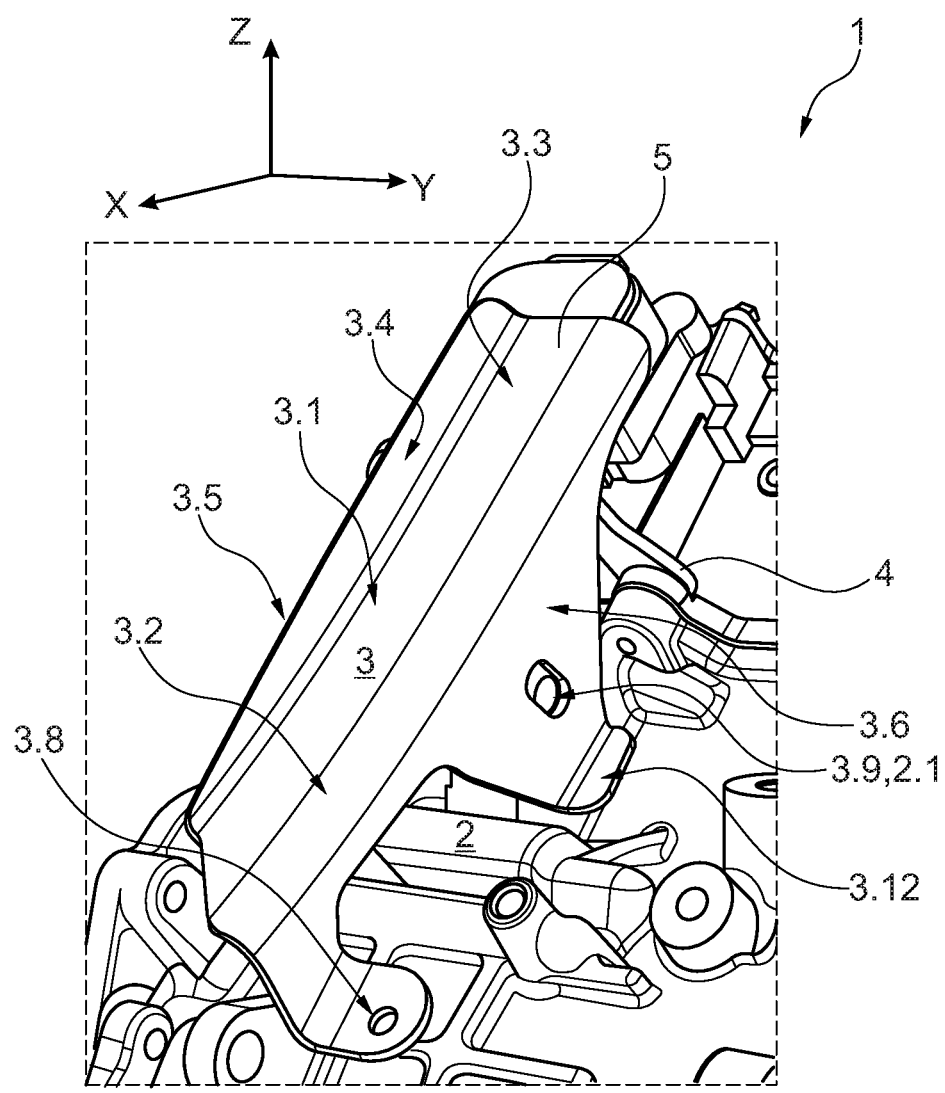
FIG. 8 shows a perspective representation of a second embodiment of an assembly.

FIG. 8 shows a representation of a second embodiment of an assembly 1 corresponding to FIG. 2, which largely coincides with the embodiment shown in FIGS. 2 to 7 and in this regard is not explained again. However, an elongated hole 3.9 is formed here on the second flange 3.6, behind which the threaded bore 2.1 is arranged. Apart from this, the second flange 3.6 is extended downwards towards the hybrid transmission 2, where a supporting section 3.12 is formed. In the normal operating state of the motor vehicle 20 shown in FIG. 8, the same is spaced apart from the surface of the hybrid transmission 2. A screw which is not shown here for the sake of clarity is passed through the elongated hole 3.9 and screwed into the threaded bore 2.1, as a result of which the second flange 3.6 is secured relative to the hybrid transmission 2 by a force-fit connection. The force-fit connection however can be overcome by a threshold force acting on the deflection face 3.1, so that at least one part of the deflection element 3 with the supporting section 3.12 is displaced towards the hybrid transmission 2 corresponding to the extension of the elongated hole 3.9. Here, a displacement of a few millimeters (for example 3 mm) is possible before the supporting section 3.12 lies against the hybrid transmission 2, as a result of which the displacement is limited. The displacement of the deflection element 3 can be restricted to a certain region and thus be accompanied by an elastic and/or plastic deformation.

Figure 10:
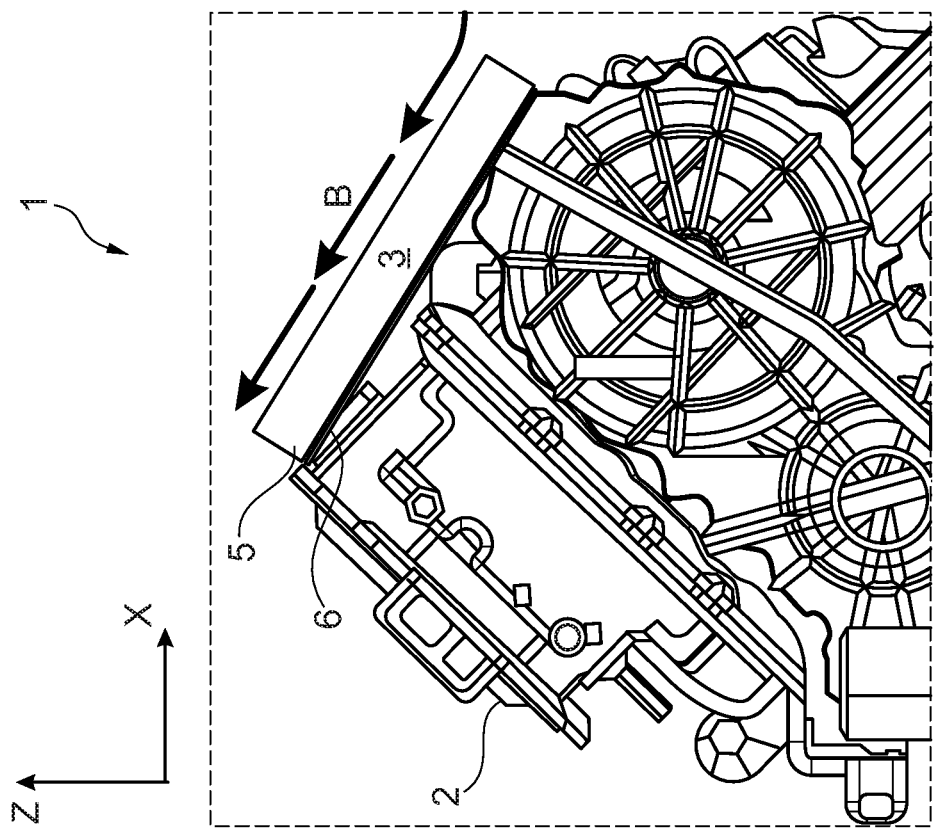
FIG. 10 shows a lateral view of the assembly from FIG. 9.
Figure 9:
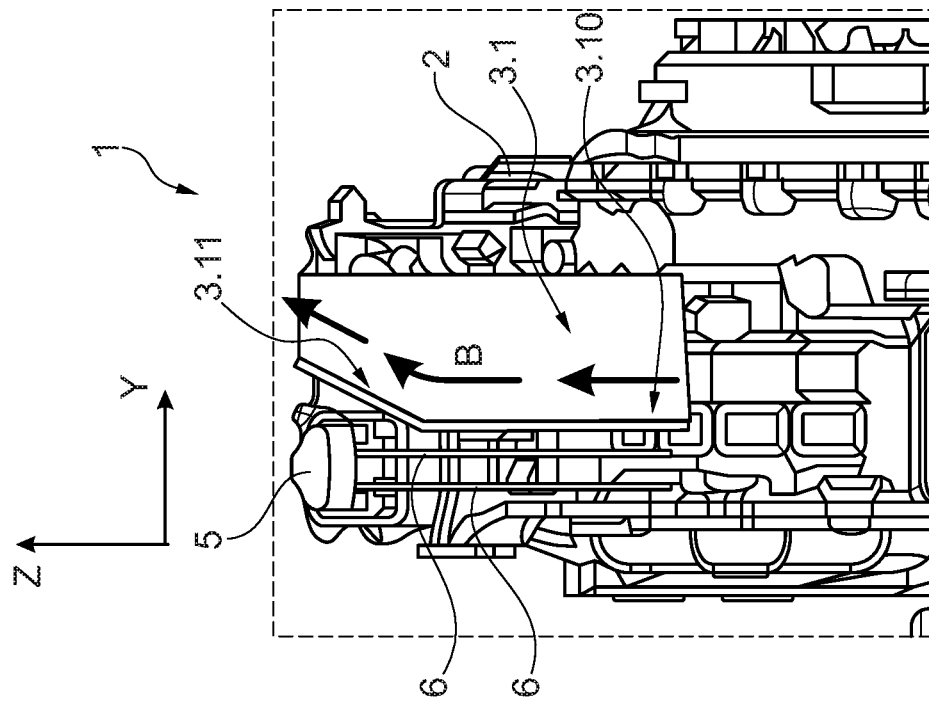
FIG. 9 shows a rearward view of a third embodiment of an assembly.

FIGS. 9 and 10 show schematically a third embodiment of an assembly 1, which is similar in terms of the fundamental construction to the first and second embodiment. In this case, however, the deflection element is offset along the Y-axis laterally to the electric elements 5, 6 and does not cover these. Aside from this, the boundary face 3.4 in this embodiment has a boundary section 3.10 at a rear end, which extends within the X-Z plane, and at a front end has a lateral deflection section 3.11, which is inclined relative to the X-Z plane towards the Y-axis. Thus, a secondary inclination, more precisely a lateral inclination of the boundary face 3.4 is increased in size along the X-axis from the back to the front. One can also say that the boundary face 3.4 in the lateral deflection section 3.11 extends from the back to the front towards a side of the deflection face 3.1 located opposite to it. From this results a relative movement B of the brake booster 10 (not shown here), during which on reaching the lateral deflection section 3.11 it is subjected to a lateral deflection relative to the Y-axis. By way of this lateral deflection, an improved protection of the connector 5 can be achieved under certain conditions. The deflection element 3 is shown in a simplified manner in FIGS. 9 and 10; in particular its attachment to the hybrid transmission 2 is not shown, which can be realized for example in a form that is similar to that of the first and second embodiment. It is also possible to modify the third embodiment so that regarding the deflection face 3.1, regions with different height inclination can also be provided.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments that are not specifically illustrated or described.

What is claimed is:

1. An assembly for a vehicle including a housing containing at least a portion of a transmission, and a vehicle component arranged between the housing and a passenger compartment, comprising:
   a deflector configured for connecting to the housing between the housing and the vehicle component and including a deflection face configured to deflect the vehicle component and/or the housing in a vertical direction as the housing moves toward the passenger compartment during a frontal collision; and
   at least one bracket configured to connect the deflector to the housing and extending at an angle to the deflection face, the at least one bracket comprising two leg sections arranged transversely to a vehicle longitudinal direction with one leg section on each side of a traction motor electrical cable.

2. The assembly of claim 1 wherein the housing includes a traction motor and at least one electrical connector and wherein the deflection face of the deflector is configured to deflect the vehicle component away from the at least one electrical connector.

3. The assembly of claim 2 wherein the at least one electrical connector is positioned on a side of the housing facing the vehicle component.

4. The assembly of claim 1 wherein the deflection face of the deflector defines an increasing inclination in a longitudinal direction from a rearward portion to a frontward portion of the deflection face.

5. The assembly of claim 1 wherein the deflector comprises a boundary face extending transversely from the deflection face in a direction away from the housing.

6. The assembly of claim 5 wherein the boundary face is inclined along a longitudinal vehicle axis.

7. The assembly of claim 1 wherein the two leg sections are arranged with one leg section on each side of a traction motor electrical connector.

8. The assembly of claim 1 wherein the at least one bracket is connected to the housing by a connecting pin, and wherein the at least one bracket or the housing includes a step section projecting parallel to a longitudinal axis of the connecting pin.

9. The assembly of claim 1 wherein the deflector is at least partly displaceable toward the housing in response to a force exceeding a threshold and acting on the deflection face, wherein at least one supporting section of the deflector limits displacement by way of support on the housing.

10. The assembly of claim 1 wherein the vehicle component comprises a brake booster connected to a brake pedal.

11. A vehicle comprising:
    a transmission having a housing;
    a traction motor coupled to the transmission;
    a brake booster disposed between the housing and a cabin and connected to a brake pedal in the cabin;
    a deflector mounted to the housing and including a deflection face configured to deflect the brake booster and/or the housing in a vertical direction as the housing moves toward the cabin during a frontal collision; and
    at least one bracket securing the deflector to the housing, the at least one bracket having two leg sections arranged on opposite sides of an electrical connection to the traction motor.

12. The vehicle of claim 11 wherein the traction motor is contained within the housing.

13. The vehicle of claim 11 wherein the deflector is at least partially displaceable toward the housing in response to a force acting on the deflection face and wherein at least one supporting section of the deflector limits displacement by contacting the housing while being displaced by the force.

14. The vehicle of claim 11 wherein the at least one bracket comprises an associated connecting pin, and wherein the at least one bracket or the housing includes a step section projecting parallel to a longitudinal axis of the connecting pin.

15. A vehicle comprising:
    a transmission having a housing;
    an electric machine and an engine selectively coupled to the transmission;
    a vehicle component disposed between the housing and a passenger compartment;
    a deflector mounted to the housing and including a deflection face configured to deflect the vehicle component away from the passenger compartment as the housing moves toward the passenger compartment during a frontal collision; and
    at least one bracket securing the deflector to the housing, the at least one bracket having leg sections arranged on opposite sides of an electrical connection to the traction motor.

16. The vehicle of claim 15 wherein the deflector is configured to deflect the housing such that electrical connections to the electric machine do not contact the vehicle component during the frontal collision.

17. The vehicle of claim 15 wherein the electric machine is contained within the housing.

\* \* \* \* \*